United States Patent Office 3,804,931
Patented Apr. 16, 1974

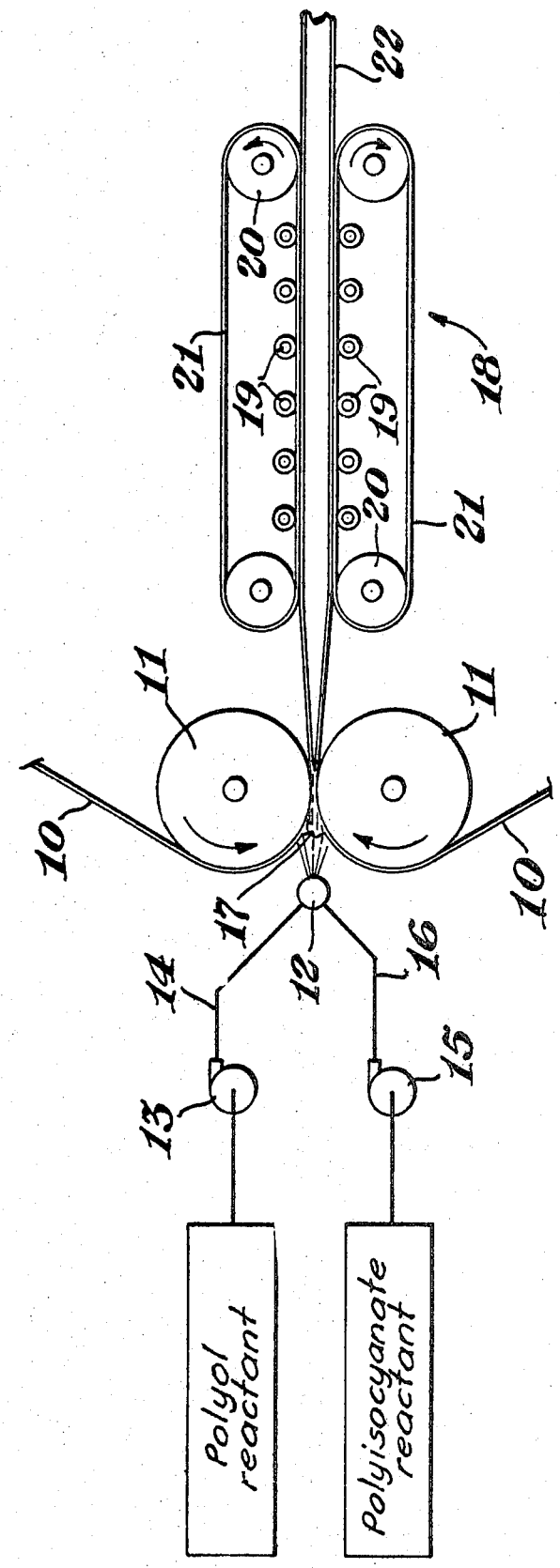

3,804,931
PROCESS FOR THE PREPARATION OF THIN POLYURETHANE FOAMS AND LAMINATES
Gordon R. Miller, Lake Jackson, Tex., assignor to The Dow Chemical Company, Midland, Mich.
Continuation-in-part of abandoned application Ser. No. 99,822, Dec. 21, 1970. This application June 5, 1972, Ser. No. 259,837
Int. Cl. B29c 5/10
U.S. Cl. 264—47                                16 Claims

ABSTRACT OF THE DISCLOSURE

Polyurethane foams and foam laminates are rapidly prepared by applying a reaction mixture comprising a polyol and a polyisocyanate to the interface formed by a pair of substrates as they pass between a pair of rolls, adjusting the pressure between said rolls such that a fillet of said reaction mixture is formed and thereafter passing the substrates containing a foaming mass therebetween through a sizing device.

---

This application is a continuation-in-part of my copending application Ser. No. 99,822, filed Dec. 21, 1970 now abandoned.

This invention relates to a method for preparing polyurethane foam sheets or slabs and laminates and particularly to a method for preparing said foams and laminates in relatively thin sections.

Polyurethane foam laminates have heretofore been prepared by placing a mixture of the reactants onto one substrate and thereafter placing a second substrate onto the mixture of reactants.

Other methods have involved gluing or otherwise attaching two substrates onto prefoamed cores to produce a foamed laminate.

These methods involved several separate operations and do not lend themselves to high speed preparation of thermoset foam laminates.

Urethane coatings have previously been applied to a single substrate by applying a coating of a polyester containing hydroxy groups, catalyst and water to the substrate and thereafter spraying a polyisocyanate in uncontrolled quantities onto the composition. Such a process is taught in U.S. 2,866,722.

The above described process differs from the present invention in that the present invention makes it possible to prepare, at high speeds, thermoset foams and sandwich structures having a foam core i.e. a plurality of substrates with foam therebetween wherein said structures possess a uniform thickness of controlled dimensions.

Several U.S. patents, e.g. U.S. 3,047,449, U.S. 3,240,-655, and U.S. 3,240,845, have employed processes whereby a mixture of reactants is applied to one or more substrates by means of traversing mixing heads. The present invention does not apply mixtures of reactants to any of the substrates by means of a traversing mechanism.

The process of the present invention lends itself readily to high speed production of polyurethane foams and foam laminates.

It has now been discovered that foam laminates having a relatively thin cross-section can be prepared at high speeds, e.g. up to about 2000 feet per minute or more by a process which comprises passing a pair of substrates between a pair of rolls, applying a reaction mixture comprising a polyol reactant and a polyisocyanate reactant in relatively close proximity to the interface formed by said substrates as they pass between the rolls, adjusting the pressure between said rolls such that a fillet of said reaction mixture is formed at said interface whereby said substrates exit from said rolls containing an expanding mass of said reaction mixture therebetween thereby producing a polyurethane foam laminate.

It has also been discovered that polyurethane foam sheets or slabs having a relatively thin cross-section can be prepared at high speeds, i.e. up to about 2000 feet per minute and above by a process which comprises passing a pair of substrates between a pair of rolls applying a reaction mixture comprising a polyol reactant and a polyisocyanate reactant in relatively close proximity to the interface formed by said substrates as they pass between the rolls, adjusting the pressure between the rolls so as to form a fillet of said reaction mixture at said interface whereby said substrates exit from said rolls containing said expanding mass of said reaction therebetween and thereafter removing said substrates from contact with the polyurethane foam contained therebetween thereby producing a polyurethane foam sheet or slab.

It is an object of the present invention to prepare polyurethane foam sheets having a relatively thin cross-section at high linear speeds.

It is another object of the present invention to prepare polyurethane foam laminates having a relatively thin cross-section at high linear speeds.

FIG. 1 is a side elevation showing one preferred method for practicing the present invention.

The compositions employed to prepare polyurethane foams are well known in the art and may be either rigid, flexible or semi-rigid. Such compositions include, for example, a polyhydroxyl-containing compound such as, the propylene oxide adduct of glycerine and the like; a polyisocyanate such as, toluene diisocyanate, polymethylene polyphenylisocyanate, isocyanate containing prepolymers and the like, a foaming or blowing agent such as, water, a low-boiling halogenated hydrocarbon such as, for example, trichloromonofluoromethane, a low boiling hydrocarbon such as, for example, pentane, and the like; a catalyst or mixtures of catalysts such as, for example, tertiary amines such as, for example, triethylenediamine, dimethylethanolamine, and the like, metal salts such as, for example, dibutyltin diacetate, dibutyltin dilaurate, and the like, and alkali metal hydroxides, such as, for example, sodium hydroxide, potassium hydroxide, and the like, and other optional ingredients such as inert fillers or colorants such as, clay or coloring agents and the like, fire retardant agents such as, for example, tris(chloroethyl)phosphate and the like.

The substrates employed herein may be either natural or synthetic materials and include paper, textile fabrics, carpet, polymer films prepared from ethylenically unsaturated monomers such as, for example, ethylene, propylene or their copolymers with other vinyl monomers, metal foils and the like. The substrates employed to prepare the sandwich structures by the process of the present invention may be the same or different.

In practicing the present invention, the foamable polyurethane composition employed should have a high order of reactivity, i.e. the composition should have low foam times, e.g. less than about 20.0 seconds and preferably less than about 10.0 seconds and in many instances preferably about 5 seconds or less from the time of contact of the polyol and the polyisocyanate until the foam has expanded to its fullest extent.

The process of the present invention is particularly suitable for the preparation of foam laminates having a thickness of from about $\frac{1}{32}$ inch to about 2 inches at linear speeds of from about 175 to about 2000 linear feet per minute or more. The preferred speed is somewhat dependent upon the thickness of the laminate being produced i.e. for laminates of from about $\frac{1}{32}$ to about $\frac{3}{4}''$ and preferably from about $\frac{1}{8}''$ to about $\frac{1}{2}''$ in thickness, conveyor speeds of at least about 250 to about 2000 linear feet per minute are preferred with speeds of from about 350 to about 600 linear feet per minute being particularly desirable. For laminates having a thickness of from about ¾" to about 2", speeds of from about 175 to about 2000 linear feet per minute are preferred, with speeds of from about 300 to about 600 linear feet per minute being most desirable.

The present process provides for the production of foam laminates at these high speeds with a minimum requirement in capital expenditures in that foam laminates prepared from foamable compositions having long foam times require extremely long conveyors to prepare foam laminates at high speeds The present process provides for the production of such foam laminates at high speeds employing conveyors of significantly shorter lengths, thereby lowering capital cost requirements for producing foam laminates.

In practicing the present invention, the component making up the reaction mixture may be supplied separately to a suitable mixer for subsequent application at the interface formed by the substrates, or they may be mixed with either the polyol or the polyisocyanate which are subsequently fed into a suitable mixer and thereafter applied to the interface.

The mixer can be a combination mixing and application device or the mixture can be formed externally to an application device such as by directing separate streams or atomized particles of the polyol component and the polyisocyanate component toward the interface such that said streams or particles converge prior to contact with said interface.

The foams and laminates produced by the present invention will generally have thicknesses in the range of from about 1/32" up to about 2₂' and preferably from about ⅛" to about ½". The foams and laminates or foamed sandwich structures may be prepared by the present invention at linear speeds of up to about 600 feet per minute and above and preferably up to about 2000 feet per minute and above.

In a preferred embodiment of the invention as shown in FIG. 1, a pair of substrates 10, are passed between a pair of rolls 11. A polyol reactant stream, containing all the components employed to produce the polyurethane foam except the polyisocyanate, is metered to the mixing-applicator device 12, by means of pump 13, through line 14. The polyisocyanate is metered to the mixing-applicator device 12, by means of pump 15, through line 16. A reaction mixture is directed from the mixing-applicator device 12 toward the center of the interface formed by the pair of substrates 10. The ratio between the polyol and the polyisocyanate is such that an NCO:OH ratio is within the range of from about 0.85:1 to about 1.2:1 and preferably in excess of about 1:1, e.g. about 1.05:1. The pressure between the rolls 11 is adjusted such that a fillet 17 of the reaction mixture is formed. The substrates 10 pass from the rolls 11 containing a rapidly expanding mass therebetween, through a sizing device generally shown at 18, comprising a plurality of rolls 19 and 20 and a pair of endless belts 21 thereby producing a polyurethane foam laminate 22 of desired thickness.

The mixing-applicator device 12 may consist of a single outlet spray or applicator head or a plurality of said applicator devices depending upon the width of the substrates, i.e. the mixture should be applied in such a manner so as to produce a fillet 17 of uniform thickness across the width of the substrates.

The distance between the pair of endless belts 21 can be varied depending upon the thickness of the laminate that is desired to be produced. The sizing device 18 may be enclosed, if desired, by a chamber, not shown, which may be heated if desired. The nip rolls 11 may also be heated if so desired. In some instances, it may be desired to heat the nip rolls 11 in order to increase the speed of reaction of the reaction mixture.

When it is desired to prepare thin sheets of polyurethane foam, the substrates are removed from the laminate so produced as in FIG. 1 after the laminate passes from the sizing device 18 by peeling and the like. A preferred method would be to employ a combination roll and sizing device wherein the pair of substrates are a pair of endless belts each of which enclose one of the rolls and one-half of the sizing device. Such an arrangement provides for automatic removal of the substrates as the foam core laminate exits from the sizing device thereby eliminating the necessity for added equipment to strip or otherwise remove the substrates from the laminate to thereby produce a thin sheet of polyurethane foam.

A suitable urethane formulation having a low foam time which may be employed to produce a polyurethane foam or polyurethane foam laminate by the process of the present invention is as follows:

Polyisocyanate: Parts by wt.
Polymethylene polyphenylisocyanate having an average functionality of about 2.6 and an NCO equivalent weight of about 135 _____ 100

Polyol stream:
A tetrafunctional polyol comprising the reaction product of aminoethylethanol amine with 3 moles of propylene oxide per mole of aminoethyl ethanol amine having an OH equivalent of about 70 _____ 50
Silicone oil (cell control agent) _____ 1.4
Dimethylethanolamine (catalyst) _____ 1.4
Dibutyltin dilaurate (catalyst) _____ 0.14
Trichlorofluoromethane (blowing agent) _____ 25.7

Another suitable urethane formulation which may be employed to produce a polyurethane foam or polyurethane foam laminate by the process of the present invention is as follows:

Polyisocyanate: Parts by wt.
Polymethylene polyphenylisocyanate having an average functionality of about 2.6 and an NCO equivalent weight of about 135 _____ 138

Polyol stream:
Reaction product of sucrose and propylene oxide having a hydroxyl number of about 375 _____ 51
Reaction product of aminoethylethanolamine with propylene oxide having a hydroxyl number of about 800 _____ 49
Potassium hydroxide (catalyst) _____ 0.5
Silicone oil (cell control agent) _____ 0.75
Trichloromonofluoromethane (blowing agent) __ 38

I claim:

1. A process for rapidly producing polyurethane foam laminates which comprises passing a pair of substrates, at speeds up to about 2000 linear feet per minute, between a pair of nip rolls, applying to said substrates, at a point in close proximity to the interface formed by the substrates as they pass into said rolls, a foamable mixture having a foam time of less than about 20 seconds comprising a polyol, a polyisocyanate, a blowing agent, and a catalyst for the reaction between said polyol and said polyisocyanate, forming a fillet of said foamable mixture at the interface formed by said substrates as they pass between said nip rolls, said steps creating an expanding polyurethane reaction mass between said substrates after such substrates exit from said nip rolls, allowing said mass to expand, sizing the expanding mass and controlling the quantity of foamable mixture passing between said nip rolls to produce a cured polyurethane foam laminate having a thickness of between about 1/32" and about 2" after sizing.

2. The process of claim 1 wherein the polyurethane foam laminate has a uniform thickness within the range of from about ⅛" to ½" and the laminate is produced at speeds of from about 250 up to about 2000 linear feet per minute.

3. The process of claim 2 wherein the reaction mixture has an NCO:OH ratio between about 0.85:1 and 1.2:1 and the laminate is produced at speeds of from about 350 up to about 600 linear feet per minute.

4. The process of claim 3 wherein the foam time of the reaction mixture is less than about 10 seconds.

5. The process of claim 3 wherein the polyol is the reaction product of aminoethyl ethanolamine with propylene oxide in a molar ratio of 1:3 respectively, said polyol having an OH equivalent weight of about 70 and wherein the polyisocyanate is polymethylene polyphenyl isocyanate having an average NCO functionality of about 2.6 and an NCO equivalent weight of about 135.

6. The process of claim 3 wherein the polyol is a mixture of
(A) the reaction product of sucrose with propylene oxide to a hydroxyl number of about 375 and
(B) the reaction product of aminoethylethanol amine with propylene oxide to a hydroxyl number of about 800, and wherein the polyisocyanate is polymethylene polyphenylisocyanate having an average functionality of about 2.6 and an NCO equivalent weight of about 135.

7. A process for rapidly producing a polyurethane foam sheet which comprises removing the substrates from the laminate produced in claim 1.

8. A process for rapidly producing a polyurethane foam sheet which comprises removing the substrates from the laminate produced in claim 2.

9. A process for rapidly producing a polyurethane foam sheet which comprises removing the substrates from the laminate produced in claim 3.

10. The process of claim 1 wherein the polyurethane foam laminate has a uniform thickness within the range of from about ¾" to about 2" and the laminate is produced at speeds of from about 175 up to about 2000 linear feet per minute.

11. The process of claim 10 wherein the reaction mixture has an NCO:OH ratio between 0.85:1 and 1.2:1 and the laminate is produced at speeds of from about 300 up to about 600 linear feet per minute.

12. The process of claim 11 wherein the foam time of the reaction mixture is less than about 10 seconds.

13. The process of claim 3 wherein the polyol is the reaction product of aminoethyl ethanol amine with propylene oxide in a molar ratio of 1:3 respectively, said polyol having an OH equivalent weight of about 70 and wherein the polyisocyanate is a polymethylene polyphenyl isocyanate having an average NCO functionality of about 2.6 and an NCO equivalent weight of about 135.

14. The process of claim 13 wherein the polyol is a mixture of
(A) the reaction product of sucrose with propylene oxide to a hydroxyl number of about 375 and
(B) the reaction product of aminoethylethanol amine with propylene oxide to a hydroxyl number of about 800, and wherein the polyisocyanate is polymethylene polyphenylisocyanate having an average functionality of about 2.6 and an NCO equivalent weight of about 135.

15. A process for rapidly producing a polyurethane foam sheet which comprises removing the substrates from the laminate produced in claim 10.

16. A process for rapidly producing a polyurethane foam sheet which comprises removing the substrates from the laminate produced in claim 11.

References Cited
UNITED STATES PATENTS

| | | | |
|---|---|---|---|
| 3,551,945 | 1/1971 | Eyberg | 18—4 B |
| 3,477,890 | 11/1969 | Kitaj | 156—79 |
| 3,049,463 | 8/1962 | Kallander | 156—78 |

MAURICE J. WELSH, JR., Primary Examiner

U.S. Cl. X.R.

18—4 B, 5 A; 156—78, 79

PO-1050
(5/69)

UNITED STATES PATENT OFFICE
CERTIFICATE OF CORRECTION

Patent No. 3,804,931     Dated April 16, 1974

Inventor(s) G. R. Miller

It is certified that error appears in the above-identified patent and that said Letters Patent are hereby corrected as shown below:

Col. 3, l. 34, change "$2_2$'" to --2"--.

Col. 5, l. 40, after "between" insert --about--.

Signed and sealed this 8th day of October 1974.

(SEAL)
Attest:

McCOY M. GIBSON JR.
Attesting Officer

C. MARSHALL DANN
Commissioner of Patents